(12) United States Patent
Hideur et al.

(10) Patent No.: US 10,879,667 B2
(45) Date of Patent: Dec. 29, 2020

(54) LASER SOURCE FOR EMITTING A GROUP OF PULSES

(71) Applicants: CENTRE NATIONAL DE LA RECHERCHE SCIENTIFIQUE, Paris (FR); INSTITUT NATIONAL DES SCIENCES APPLIQUEES-ROUEN, St Etienne du Rouvray (FR); UNIVERSITE DE ROUEN NORMANDIE, Mont-Saint-Aignan (FR)

(72) Inventors: Ammar Hideur, Le Petit Quevilly (FR); Adil Haboucha, Saint-Etienne-du-Rouvray (FR); Arnaud Bultel, Rouen (FR); Said Idlahcen, Sotteville-lès-Rouen (FR); Thomas Godin, Le Petit Quevilly (FR)

(73) Assignees: CENTRE NATIONAL DE LA RECHERCHE SCIENTIFIQUE, Paris (FR); INSTITUT NATIONAL DES SCIENCES APPLIQUEES-ROUEN, St Etienne du Rouvray (FR); UNIVERSITE DE ROUEN NORMANDIE, Mont-Saint-Aignan (FR)

( * ) Notice: Subject to any disclaimer, the term of this patent is extended or adjusted under 35 U.S.C. 154(b) by 0 days.

(21) Appl. No.: 16/487,792

(22) PCT Filed: Feb. 27, 2018

(86) PCT No.: PCT/EP2018/054829
§ 371 (c)(1),
(2) Date: Aug. 21, 2019

(87) PCT Pub. No.: WO2018/158261
PCT Pub. Date: Sep. 7, 2018

(65) Prior Publication Data
US 2020/0028316 A1  Jan. 23, 2020

(30) Foreign Application Priority Data

Feb. 28, 2017 (FR) .................................... 17 51653

(51) Int. Cl.
*H01S 3/10* (2006.01)
*H01S 3/00* (2006.01)
(Continued)

(52) U.S. Cl.
CPC ........ *H01S 3/10046* (2013.01); *H01S 3/0057* (2013.01); *H01S 3/06754* (2013.01);
(Continued)

(58) Field of Classification Search
CPC ............... H01S 3/10046; H01S 3/0057; H01S 3/10015; H01S 3/2308; H01S 3/10084;
(Continued)

(56) References Cited

U.S. PATENT DOCUMENTS

| 9,065,243 B2 * | 6/2015 | Asobe | G02F 1/3532 |
| 2004/0227949 A1 * | 11/2004 | Dorrer | G01J 11/00 |
| | | | 356/450 |

(Continued)

OTHER PUBLICATIONS

Labutin et al. "Femtosecond laser-induced breakdown spectroscopy", Journal of Analytical Atomic Spectrometry, vol. 31, No. 1, pp. 90-118, (2016).
(Continued)

*Primary Examiner* — Kinam Park
(74) *Attorney, Agent, or Firm* — BakerHostetler (57) ABSTRACT

A laser source for emitting a group of pulses, includes a primary laser source suitable for emitting at least one primary laser pulse; at least one interferometer suitable for forming, from the primary laser pulse, a plurality of secondary laser pulses, each interferometer comprising at least one delay line allowing two secondary laser pulses to be temporally separated, by a delay comprised between 50 ps
(Continued)

and 10 ns; and a single-mode amplifying optical fiber intended to receive the secondary laser pulses, in order to form as output a group of spatially superposed pulses.

14 Claims, 9 Drawing Sheets

(51) Int. Cl.
 *H01S 3/23* (2006.01)
 *H01S 3/094* (2006.01)
 *H01S 3/067* (2006.01)

(52) U.S. Cl.
 CPC .. *H01S 3/094003* (2013.01); *H01S 3/094053* (2013.01); *H01S 3/10015* (2013.01); *H01S 3/10023* (2013.01); *H01S 3/10084* (2013.01); *H01S 3/2308* (2013.01)

(58) Field of Classification Search
 CPC ............. H01S 3/10023; H01S 3/06754; H01S 3/094003; H01S 3/094053
 See application file for complete search history.

(56) References Cited

U.S. PATENT DOCUMENTS

| | | |
|---|---|---|
| 2009/0080467 A1 | 3/2009 | Starodoumov et al. |
| 2009/0246413 A1 | 10/2009 | Murakami et al. |
| 2013/0259070 A1* | 10/2013 | Fermann ............... H01S 3/1106 372/6 |
| 2014/0205301 A1* | 7/2014 | Frohlich ............... H04B 10/70 398/152 |
| 2015/0304051 A1* | 10/2015 | Yuan ..................... H04B 10/70 398/188 |

OTHER PUBLICATIONS

Scaffidi et al., "Observations in collinear femtosecond-nanosecond dual pulse laser-induced breakdown spectroscopy", Applied Spectroscopy, vol. 60, No. 1, pp. 65-71, (2006).

Kienel, et al., "Multidimensional coherent pulse addition of ultrashort laser pulses", Optics Letters, vol. 40, Issue 4, pp. 522-525, Feb. 15, 2015.

Mildner, et al., "Emission signal enhancement of laser ablation of metals (aluminumand titanium) by time delayed femtosecond double pulses fromfemtoseconds to nanoseconds", Applied Surface Science, vol. 302, pp. 291-298, May 30, 2014.

* cited by examiner

LASER SOURCE FOR EMITTING A GROUP OF PULSES

CROSS-REFERENCE TO RELATED APPLICATIONS

This application is a National Stage of International patent application PCT/EP2018/054829, filed on Feb. 27, 2018, which claims priority to foreign French patent application No. FR 1751653, filed on Feb. 28, 2017, the disclosures of which are incorporated by reference in their entirety.

FIELD OF THE INVENTION

The present description relates to a laser source for emitting a group of pulses, for example a doublet or a triplet of pulses, in particular for laser-induced breakdown spectroscopy (LIBS). The present description also relates to a method for generating a group of pulses and to an LIBS analysis system comprising such a laser source.

BACKGROUND

Prior Art

Laser-induced breakdown spectroscopy (LIBS) is a technique for qualitatively and quantitatively analyzing the chemical composition of various solid, liquid or gaseous materials or materials in aerosols. The technique is based on the interaction of a laser pulse with a material to be analyzed. The light/matter interaction causes the material to vaporize and form a plasma. The atoms and ions of the material present in the plasma are raised to excited energy levels and emit, on de-excitation, light having a spectrum made up of atomic lines, the wavelengths of which allow the elements present to be identified. The intensity of each line is proportional to the concentration of the emitter atoms. The elementary composition of the material may thus be deduced therefrom.

However, the characteristics of the emission do not depend solely on the material, but also on the ambient air; lines generated by excited atoms of the ambient air may then mask compounds of the material and make the analysis of the LIBS signal imprecise, in particular in the case where the pulses of the laser used are of nanosecond length. To mitigate this drawback, the LIBS may use femtosecond lasers, i.e. lasers that generate femtosecond pulses (duration <1 ps). The use of femtosecond pulses allows the interaction between the ambient gas and the laser pulses, which may result in the emission of a continuum, to be decreased. The decrease in the emission of the continuum allows the emission lines of the plasma to be observed with a better contrast. The use of femtosecond pulses also makes it possible to minimize the dimensions of the heated zone and the mechanical deformation of the material to be analyzed. This results not only in a better spatial resolution and in precise machining, but also in a better measurement reproducibility.

However, the intensities of the spectral lines of the plasma generated by femtosecond pulses are lower than those produced by nanosecond pulses. Although it has been demonstrated that the intensities of the exploitable lines of the plasma increase with the energy of the femtosecond pulses, the high cost of ultra-rapid high-power lasers and the complexity of their technology make the use of this technique difficult in particular in an industrial environment outside of the laboratory.

The use of the dual-pulse LIBS (DP-LIBS) technique, and more precisely the collinear-configuration DP-LIBS technique, is an attempt to improve the performance of LIBS using femtosecond lasers. Collinear-configuration DP-LIBS consists in using two femtosecond collinear pulses one of which is delayed with respect to the other by a few tens of picoseconds to a few nanoseconds. These two pulses interact with the material to be analyzed in such a way as to allow the intensity of the atomic lines to be increased. In general, the first pulse allows the material to be analyzed to be ablated and the second pulse serves to heat the plasma generated, this resulting in an exacerbation of the LIBS signal and leading to an improvement in the detectivity threshold. The review article by Labutin et al. "Femtosecond laser-induced breakdown spectroscopy", Journal of Analytical Atomic Spectrometry 31, pp. 90-118 (2016) reviews the various DP-LIBS configurations that have been proposed and the performance achieved thereby. Studies on DP-LIBS in the femtosecond regime have shown that the degree of exacerbation obtained is moderate because of the small amount of heating energy generated by a femtosecond pulse. The solution has been to combine the femtosecond ablation pulse with a nanosecond pulse for heating the plasma. This solution, which was proposed for the first time in the article by Scaffidi et al., "Observations in collinear femtosecond-nanosecond dual pulse laser-induced breakdown spectroscopy" Applied Spectroscopy, 60, pp. 65-(2006), is based on the combination of two pulses generated by two different laser sources, increasing the cost and the complexity of implementation. The present description presents a single laser source that is able to directly generate two asymmetric pulses, for example a femtosecond pulse followed by a sub-nanosecond pulse, that are particularly suitable for the exacerbation of LIBS signals and that allows a better analysis sensitivity to be achieved.

SUMMARY OF THE INVENTION

According to a first aspect, the present description relates to a laser source for emitting a group of pulses, comprising: a primary laser source suitable for emitting at least one primary laser pulse; one or more interferometers suitable for forming, from said primary laser pulse, a plurality of secondary laser pulses, each interferometer comprising at least one delay line allowing two secondary laser pulses to be temporally separated, by a delay comprised between 50 ps and 10 ns; and a single-mode amplifying optical fiber intended to receive the secondary laser pulses, in order to form as output a group of spatially superposed pulses.

The laser source thus described allows a group of collinear pulses to be generated that are delayed with respect to one another and spatially superposed. The applicants have thus demonstrated a degree of spatial overlap of the pulses higher than 90%, advantageously higher than 95%, and advantageously higher than 99%. The degree of overlap of two or more pulses is for example defined using a function giving the cross-correlation of the images of said pulses, the images for example being formed in the focal plane of a focusing lens arranged at the exit of the single-mode amplifying optical fiber. The applicants have demonstrated that the single-mode amplifying optical fiber of the laser source thus described plays the role of a spatial filter with respect to the secondary laser pulses, projecting them into a single mode at the exit of the optical fiber. Thus, the laser source makes it possible to ensure, automatically, a very good spatial overlap between the pulses of the group of emitted pulses, up to distances of several meters. Such a laser source also has the advantage of being compact and of greatly simplifying the adjustment of the optics of the devices described in the prior art.

By "interferometer" what is meant in the present description is any device, whether all-fiber or not, comprising means for splitting incident light pulses spatially, two arms in which each of the pulses propagate after having been split, and means for recombining the pulses spatially after propagation; and in which one of the arms forms a delay line.

According to one or more example embodiments, at least one of said interferometers comprises means for spectrally and/or temporally forming at least one of the secondary pulses. The spectrally and/or temporally forming means for example comprise a spectral filter and/or a temporally stretching device such as a variable-pitch Bragg grating.

According to one or more example embodiments, at least one of said interferometers comprises means for controlling the relative optical power of the secondary laser pulses. The means for controlling optical power for example comprise a variable attenuator arranged in one of the arms of the interferometer.

It is thus possible to control the optical powers, the pulse duration and/or the spectrum of each of the pulses of the group of pulses generated by the laser source. In the case of the LIBS measurements, this allows, for example, depending on the material to be analyzed, or even on the system used to focus the pulses on the material, the parameters of the pulses to be adjusted in order to optimize the creation of the plasma required for the LIBS measurements.

According to one or more example embodiments, the laser source furthermore comprises:
a stretcher placed upstream of the single-mode amplifying optical fiber such that the primary laser pulse is stretched to a pulse duration longer than 50 ps, and
a compressor downstream of the single-mode amplifying optical fiber in order to temporally compress the pulses of the group of pulses such that the pulses of the group of pulses have a pulse duration shorter than 500 fs.

It is thus possible to generate a group of high-energy pulses without damaging the single-mode amplifying optical fiber or inducing non-linear effects in the single-mode amplifying optical fiber.

According to one or more example embodiments, the laser source furthermore comprises at least one optical preamplifier placed upstream of the single-mode amplifying optical fiber. It is thus possible to use a primary laser source that delivers pulses of lower energy while guaranteeing the necessary optical power in the optical fiber.

According to one or more example embodiments, the laser source furthermore comprises a laser diode for optically pumping the single-mode amplifying optical fiber.

According to one or more example embodiments, the laser diode is placed so as to optically pump the single-mode amplifying optical fiber in counter-propagating regime.

According to one or more example embodiments, the single-mode amplifying optical fiber is a modal-filtering fiber.

According to one or more example embodiments, the single-mode amplifying optical fiber is a large-pitch rod-type photonic-crystal fiber.

According to one or more example embodiments, the single-mode amplifying optical fiber is intended to operate in saturated-gain regime. The saturated-gain regime makes it possible to decrease the sensitivity to variations in the exterior environment (mechanical variations, thermal variations, etc.) and in the amplitude of the generated pulses, this making it possible to make the laser source more stable from one measurement to the next. Specifically, when the single-mode amplifying optical fiber operates in saturated-gain regime, a variation in the intensity of the pulses or a variation in the coupling of the secondary laser pulses to the fiber does not modify the amplitude of the pulses of the group of pulses output from the single-mode amplifying optical fiber.

According to one or more example embodiments, to decrease bulk and simplify optical adjustments, the path of the pulses between the primary laser source and the entrance of the single-mode amplifying optical fiber is all-fiber.

According to one or more example embodiments, the primary laser source is suitable for emitting a train of primary laser pulses that are temporally separated by a delay of at least 2 μs. Thus, the primary laser source emits primary laser pulses that are temporally separated from each other by a delay longer than or equal to 2 μs in order to allow the emission of groups of pulses that are separated by a delay longer than or equal to 2 μs. Thus, advantageously, during an LIBS measurement, the excited ions of the plasma will be able to completely relax between two groups of pulses, this decreasing noise.

According to one or more example embodiments, the primary laser pulse is sub-picosecond in length.

According to one or more example embodiments, at least one of the interferometers is a Mach-Zehnder interferometer, the delay line being formed by one arm of the interferometer.

According to a second aspect, the present description relates to a laser-induced-breakdown-spectroscopy (LIBS) analysis system comprising a laser source for emitting a group of pulses, such as described according to the first aspect; a collector for collecting a beam resulting from the interaction between an object to be analyzed and the group of pulses emitted by the laser source; and a spectrometer that allows, on the basis of the spectral analysis of the collected beam, the LIBS spectrum of the object to be analyzed to be obtained.

According to a third aspect, the present description relates to a method for generating a group of pulses comprising the following steps:
emitting at least one primary laser pulse,
generating, from said primary pulse, a plurality of secondary laser pulses that are temporally separated by a delay comprised between 50 ps and 10 ns, by means of one or more interferometers,
injecting the secondary laser pulses into a single-mode amplifying optical fiber in order to form a group of spatially superposed pulses.

According to one or more example embodiments, the step of generating a plurality of secondary laser pulses furthermore comprises the step of spectrally and/or temporally forming at least one of the secondary pulses.

According to one or more example embodiments, the method for generating a group of pulses furthermore comprises the following steps:
temporally stretching the primary laser pulse such that the primary laser pulse is stretched to a pulse duration longer than 50 ps, and
temporally compressing the pulses of the group of spatially superposed pulses such that the pulses of the group of spatially superposed pulses have a pulse duration shorter than 500 fs.

According to one or more example embodiments, the method for generating a group of pulses furthermore comprises the step of saturating the gain of the single-mode amplifying optical fiber.

According to one or more example embodiments, the method for generating a group of pulses furthermore comprises the step of adjusting the delay between the secondary laser pulses.

BRIEF DESCRIPTION OF THE DRAWINGS

Other advantages and features of the subject matter of the description will become apparent on reading the description, which is illustrated by the following figures:

Here, FIGS. 1 to 3 are given by way of indication and do not present an embodiment of the invention.

DETAILED DESCRIPTION

In the figures, identical elements have been referenced with the same references.

Figure 1:
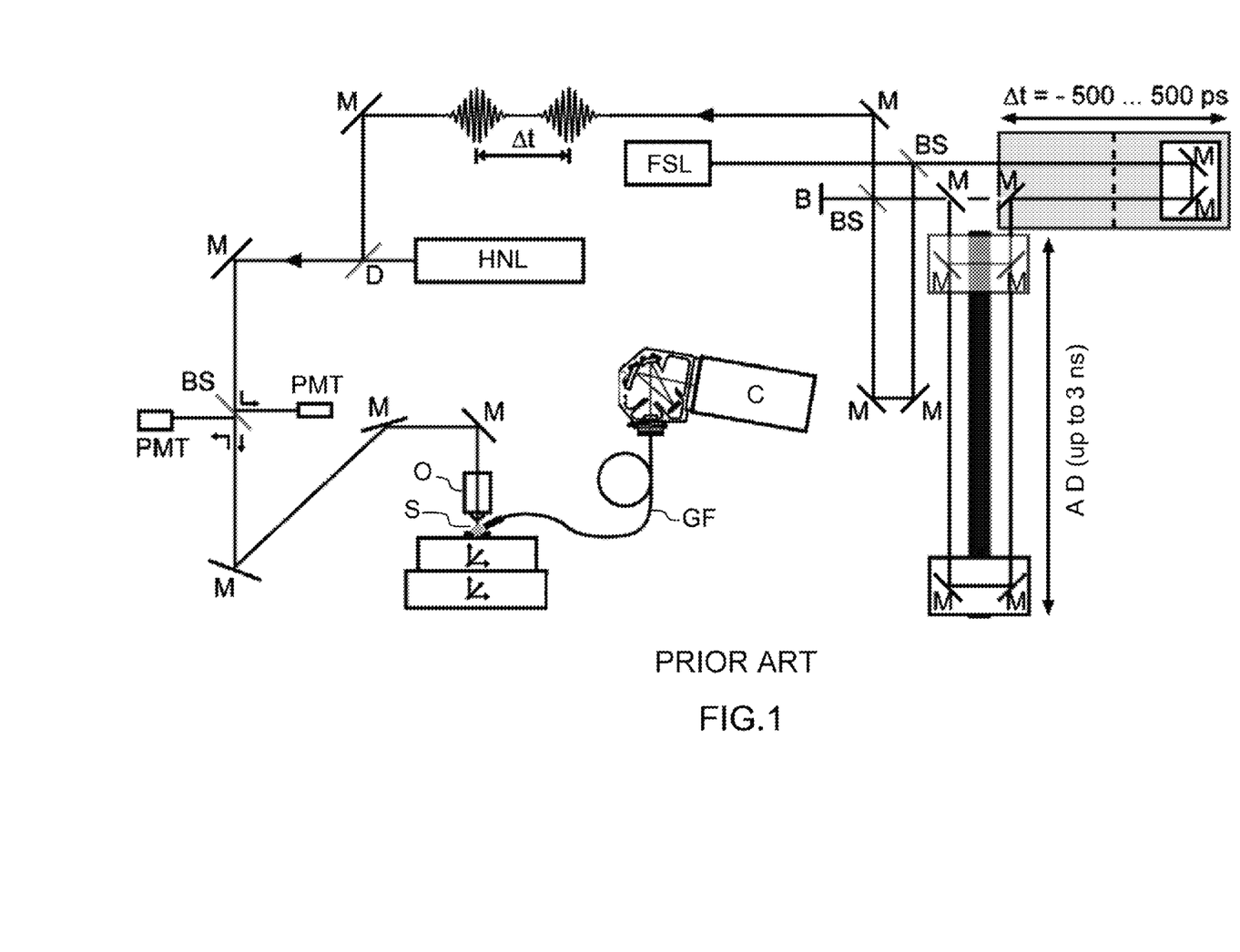
FIG. 1, a schematic of a collinear-configuration DP-LIBS system according to the prior art (already described)
Figure 2:
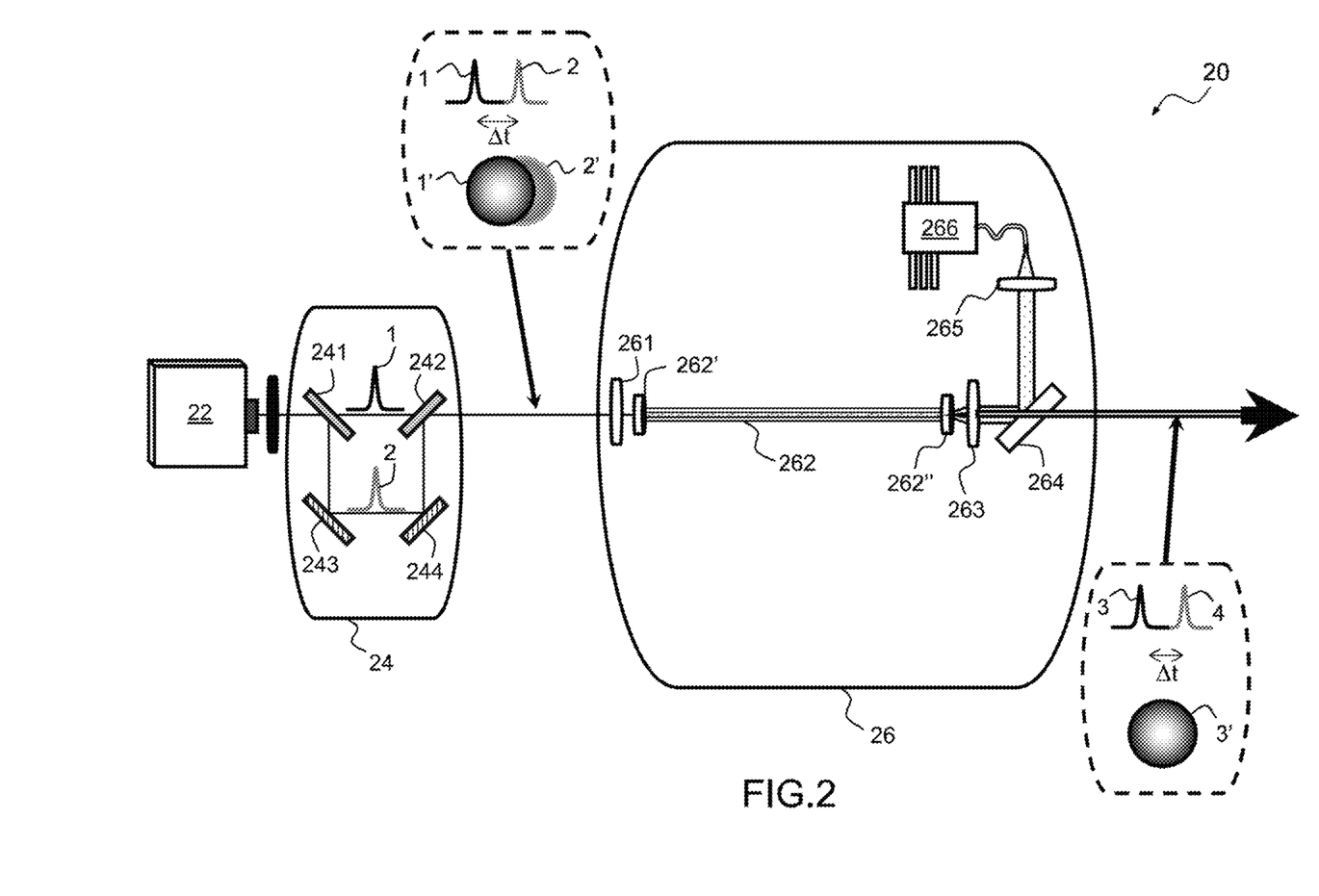
FIG. 2, a schematic of a laser source for emitting a group of pulses according to one example of the present description.

FIG. 2 illustrates a first example of a laser source 20 for emitting a group of pulses according to the present description. It comprises a primary laser source 22, an interferometer 24 suitable for forming two secondary laser pulses 1, 2, and an amplifying module 26 comprising a single-mode amplifying optical fiber 262 that is intended to receive said secondary laser pulses 1, 2, in order to form a group of spatially superposed pulses 3, 4.

In the example shown in FIG. 2, the primary laser source 22 is for example suitable for emitting at least one primary laser pulse of a sub-picosecond duration for example, and for example of a sub-500 fs duration. It may also emit a train of primary laser pulses with an adjustable repetition rate comprised between 1 kHz and 500 kHz. In this case, the pulses are spaced apart by 2 µs to 1 ms. The primary laser source may for example comprise a standard mode-locked laser operating at a fixed repetition rate, for example of a few tens of MHz, which may be followed by a pulse selector allowing the repetition rate of the primary source to be decreased for example to less than 500 kHz. The primary source may include a preamplifier in order to compensate for insertion losses in the pulse selector.

In the example of FIG. 2, the laser source comprises an interferometer suitable for forming, from the primary laser pulse, two secondary laser pulses. The laser source may also comprise a plurality of interferometers in series in order to generate a grouping of an even number of pulses, as will be described below. It is also possible to interleave the interferometers with one another in order to generate uneven-number groupings of pulses.

In the example of FIG. 2, the interferometer is a Mach-Zehnder interferometer. It comprises two mirrors 243, 244 and two half-silvered mirrors 241 and 242. Using a half-silvered mirror 241, the primary laser pulse is divided into two secondary laser pulses 1, 2 that trace two different optical paths; the optical path of pulse 1 is made longer than the optical path of pulse 2 by means of two half-silvered mirrors 243, 244. Next, the two secondary laser pulses are recombined using a half-silvered mirror 242. In this way, the two secondary laser pulses are temporally separated by a delay $\Delta t = \delta/c$ with c the speed of propagation of light and $\delta$ the difference between the two optical paths traced by the two secondary laser pulses 1, 2. This delay may be adjusted by modifying the difference $\delta$ between the optical paths and therefore the length of one of the optical paths. To modify the difference between the optical paths, it is possible for example to move the position of the two mirrors 243 and 244. It will be noted that the delay $\Delta t$ is chosen to be longer than or equal to the duration of the primary pulse, such that the two secondary laser pulses 1, 2 cannot interfere with each other.

For LIBS measurements, the delay $\Delta t$ is preferably adjustable between about ten picoseconds and a few nanoseconds, and for example between 50 ps and 10 ns. This makes it possible to adapt the inter-pulse delay in order to optimize the heating of the plasma produced by the first pulse of the doublet, which delay varies from one material to the next.

The interferometer may also be a Michelson interferometer or any other type of interferometer. For example, a Michelson interferometer may comprise two mirrors and a plate beamsplitter. The primary laser pulse is sent to the beamsplitter, which splits the primary pulse into two secondary laser pulses. One thereof is sent to one of the mirrors and the other to the other mirror. The two mirrors are at a different distance from the beamsplitter, thus allowing an optical path difference $\delta$ to be introduced and therefore a delay $\Delta t$ to be introduced between the two secondary laser pulses. The movement of the position of the mirrors allows the delay between the two secondary laser pulses to be adjusted.

According to one or more example embodiments, the interferometer is all-fiber and in this case, it may for example comprise one or more optical fibers arranged around a piezoelectric drum, as will be described later on.

As illustrated in FIG. 2, at the exit of the interferometer 24, the spatial energy distributions of the two secondary laser pulses 1, 2 (which are referenced 1' and 2') are not perfectly spatially superposed. Specifically, there remains an offset due to the difficulty in aligning the interferometer and to perturbations related to the environment.

The two secondary laser pulses are then injected into an amplifying module 26. The amplifying module comprises a single-mode amplifying optical fiber 262 to which the secondary laser pulses 1, 2 are coupled using, for example, a lens 261 or a splice (two welded fibers) in the case of a monolithic all-fiber configuration (see FIG. 4). The lens 261 thus allows the secondary laser pulses to be coupled to the single mode of the single-mode amplifying fiber. It is also possible to use glass end fittings 262' and 262" welded to the ends of the fiber in order to increase the size of the beam output and thus push back the threshold of optical damage at high intensities.

The mode of a waveguide—such as a single-mode optical fiber—indicates the way in which light propagates within the guide. In a single-mode fiber, there is only one single propagation mode. The single-mode character of the single-mode amplifying optical fiber thus ensures the secondary laser pulses output from the single-mode amplifying optical fiber are spatially superposed. In other words, the single-mode amplifying optical fiber plays the role of a spatial filter, projecting the two secondary laser pulses into a single mode and thus "cleaning" the secondary laser pulses in the single mode of the fiber. The applicants have shown that a degree of spatial overlap higher than 90% or more can thus be obtained between the pulses of the group of pulses thus formed.

The spatial overlap of the pulses may for example be measured by means of a function giving the cross-correlation of the images of the pulses formed in the focal plane of a focusing lens arranged downstream of the single-mode amplifying optical fiber. For example, the function r(u, v) giving the cross-correlation between the two images of the beams formed at the focal point of a focusing lens placed at the exit of the single-mode amplifying fiber is computed. This function is given by the equation:

$$r(u, v) = \frac{\sum_{x,y}[(f(x, y) - \bar{f}) * (g(x - u, y - v) - \bar{g})]}{\sum_{x,y}\sqrt{(f(x, y) - \bar{f})^2} \sum_{x,y}\sqrt{(g(x - u, y - v) - \bar{g})^2}}$$

Where f(x, y) and g(x, y) are the images corresponding to the two pulses of the doublet and $\bar{f}$ and $\bar{g}$ are the average intensities of the two images. The maximum value of the function "r" gives the degree of resemblance between the two images, which improves as the degree of resemblance approaches 1. Moreover, the position of the maximum peak of "r" indicates the degree of overlap between the two images. The more centered the maximum is on the point of coordinates u=0, v=0, the better the overlap. Thus, a function "r" giving a cross-correlation having a peak the maximum value of which is close to 1, for example higher than 0.99, and that is centered on the point of coordinates (0, 0) or in proximity to the point of coordinates (0, 0), will possibly be sought.

The single-mode amplifying optical fiber also allows the intensity of the secondary laser pulses to be amplified and thus allows a not very powerful primary laser source to be used.

The single-mode amplifying fiber may be optically pumped with a light beam emitted by a pumping means such as a diode or a laser in order to induce the population inversion. When the secondary laser pulses pass through the single-mode amplifying optical fiber, their intensities are decoupled via the stimulated-emission effect induced by the active ions. Total gains over all the length of the active fiber of 20 to 30 dB may thus be achieved.

The intensities of the secondary pulses at the entrance of the single-mode amplifying optical fiber are preferably adjusted so as to ensure the latter operates in saturated-gain regime. The intensity of the pulses at the entrance of the single-mode amplifying optical fiber is adjusted upstream by the primary source or by inserting a preamplifier. The saturated-gain regime has the advantage of making the laser source insensitive to the exterior environment. In particular, during operation of the laser source in free space, the amplitudes of the amplified pulses will be less sensitive to variations in the exterior environment (mechanical variations, thermal variations, etc.) and therefore more stable from one measurement to the next. Thus, when the single-mode amplifying optical fiber operates in saturated-gain regime, a variation in the intensity of the secondary laser pulses or a variation in the coupling thereof to the fiber will not modify the spatial superposition of the pulses or the intensity of the pulses of the group of pulses output from the single-mode amplifying optical fiber.

As illustrated in FIG. 2, the amplifying module 26 may comprise a laser diode 266 in order to achieve the population inversion in said single-mode amplifying fiber 262. To this end, a pumping light beam is emitted by the diode 266 and injected into the optical fiber using transmitting elements such as lenses 265 and 266 and a mirror 264. The pumping light beam may be injected into the single-mode amplifying optical fiber in a counter-propagating manner, i.e. into the exit 262" of the optical fiber, or in a co-propagating manner, i.e. into the entrance 262' of the optical fiber.

The single-mode amplifying optical fiber is for example a double-clad fiber the core of which is doped with active ions such as rare-earth ions (for example erbium, neodymium, ytterbium, thulium, praseodymium or holmium ions); the single-mode amplifying optical fiber may be a doped large-mode-area fiber or a fiber that achieves distributed modal filtering ensuring a single-mode behavior with a core diameter for example ranging up to 80 μm, or even a large-pitch (LPF) rod-type photonic-crystal fiber. The single-mode amplifying optical fiber supports a single mode and advantageously has a sufficient length to produce a total gain comprised between 20 and 30 dB.

In the case of a single-mode amplifying optical fiber with a core doped with ytterbium ions operating at a wavelength of 1 μm, pumping diodes emitting at 915 or 976 nm may for example be used.

In FIG. 2, the secondary laser pulses 3, 4 output from the optical fiber are then collected for example using a lens 263. The spatial energy distributions (3') of the secondary laser pulses 3 and 4 are now spatially superposed and collinear as illustrated in the insert on the right of FIG. 2. Moreover, because of the saturated-gain regime of the example of FIG. 2, the intensities of the secondary laser pulses 3, 4 output from the optical fiber are substantially identical.

Figure 3:
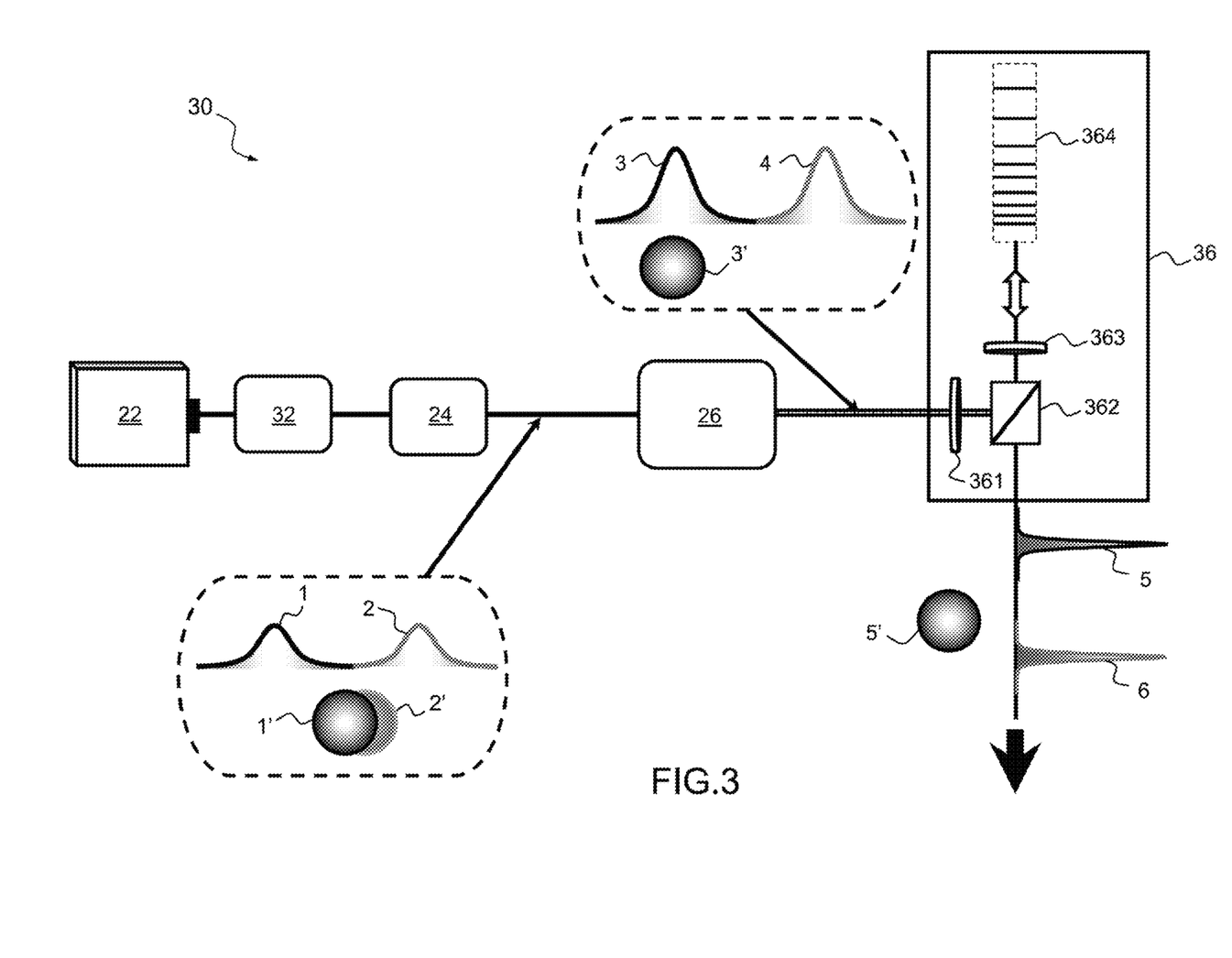
FIG. 3, a schematic of a laser source for emitting a group of pulses according to one example of the present description comprising a stretcher and a compressor.

FIG. 3 shows another example of a laser source according to the present description. The laser source 30 of FIG. 3 for example comprises a primary laser source 22, a pulse stretcher 32, one or more interferometers (in FIG. 3 only a single interferometer 24 has been shown), an amplifying module 26 comprising a single-mode amplifying optical fiber, and a pulse compressor 36.

The example of FIG. 3 furthermore has the advantage of forming a group of high-intensity pulses while decreasing the risk of damaging the fiber or of generating non-linear effects that could cause degradation of the pulses output from the fiber.

The primary laser source 22 is suitable for emitting at least one primary laser pulse of sub-picosecond duration. The primary laser pulse is sent to a pulse stretcher 32 in order to temporally stretch the primary laser pulse, such that afterwards the primary laser pulse has a pulse duration longer than 50 ps. The temporal stretching of the primary pulse will decrease its peak power by a factor ranging from 50 to more than 1000. The stretcher may be placed upstream of the single-mode amplifying optical fiber. In the example of FIG. 3, the stretcher 23 is placed upstream of the interferometer 24. The stretched primary laser pulse then follows the same path to the exit of the single-mode amplifying optical fiber as the path followed by the primary laser pulse of FIG. 2.

Downstream of the single-mode amplifying optical fiber, the spatially indiscernible secondary laser pulses are sent to a pulse compressor 36. The pulse compressor allows the secondary laser pulses to be temporally compressed, such that afterwards the durations of the secondary laser pulses are sub-picosecond as they were on being output from the primary source. The temporal compression of the amplified secondary laser pulses causes a substantial increase in the peak power of the spatially superposed secondary laser pulses.

The stretcher is for example of bulk-grating type. It may be a question of a normal-dispersion optical fiber or a variable-pitch Bragg grating photo-inscribed in an optical fiber or in bulk glass.

The compressor may comprise, as illustrated in FIG. 3, a half-wave plate 361, in order to modify the orientation of the linear polarization of the amplified secondary pulses, and a polarizing cube beamsplitter 362, in order to reflect the secondary laser pulses toward a variable-pitch volume Bragg grating 364 through a quarter-wave plate for converting the linear polarization into circular polarization. The secondary laser pulses completely reflected by the variable-pitch volume Bragg grating see their durations decreased to a sub-picosecond value close to the duration of the primary pulse. The compressed secondary pulses are directed toward the exit of the laser source by the combined actions of the quarter-wave plate and of the polarizing beamsplitter, with a view to emitting spatially superposed secondary laser pulses with a pulse duration shorter than 500 fs and a peak power higher than 2 MW. Other types of compressor may be used, such as a pair of diffraction gratings.

Figure 4:
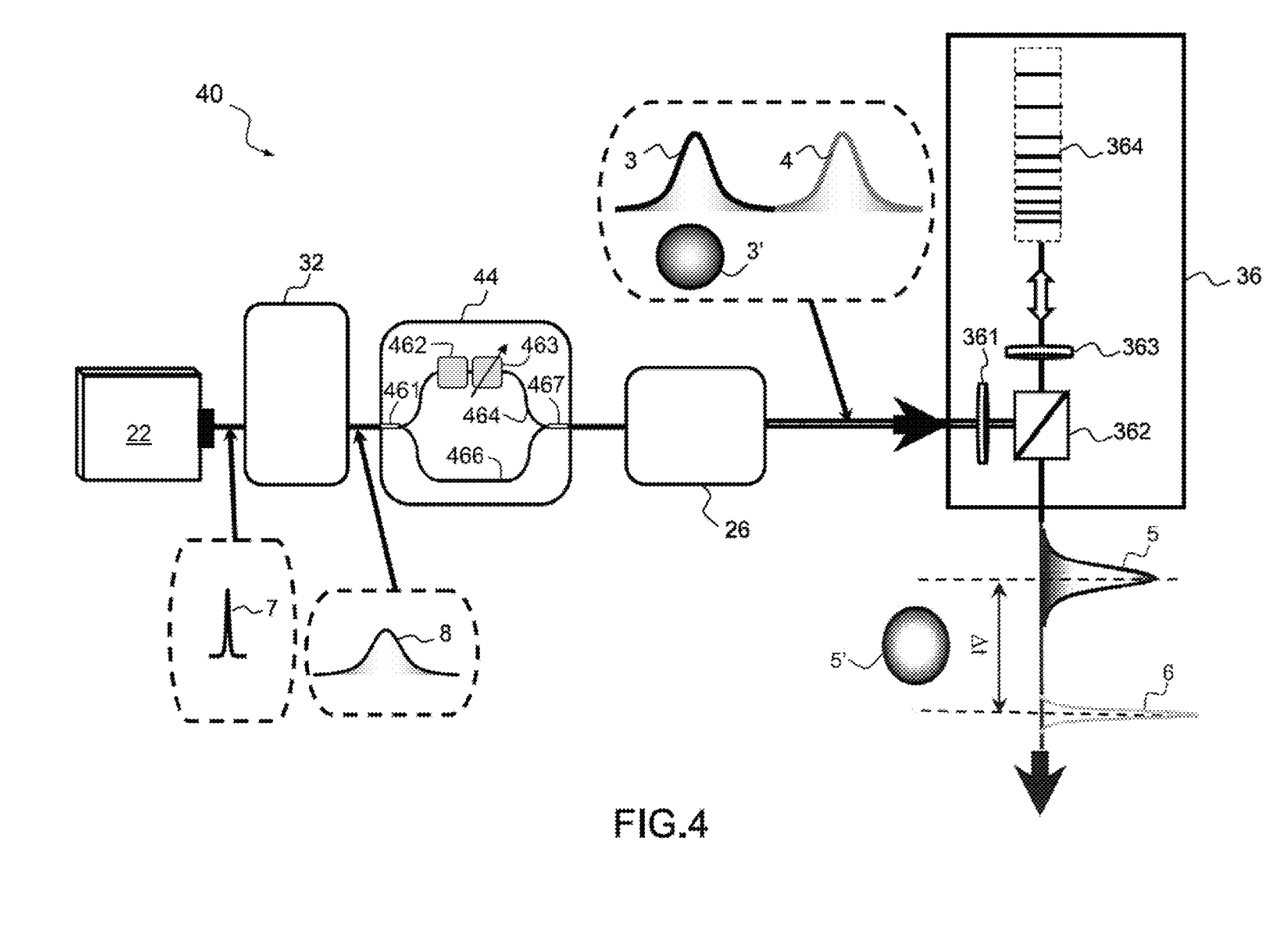
FIG. 4, a schematic of another example of a laser source for emitting a group of pulses according to one example of the present description, said source being all-fiber.

FIG. 4 shows an example of a laser source according to one example of the present description, in which the laser source is all-fiber. In this example, a stretcher 32 and a compressor 36 have also been shown, but these elements are optional. The stretcher 32 is placed upstream of an all-fiber interferometer 44 and the compressor 36 is placed downstream of the amplifying module 26. In this example, the path of the pulses between the primary laser source 22 and the amplifying module 26 is all-fiber. Likewise, the interferometer 44 is all-fiber. In this case, the interferometer may comprise at least one motorized delay line 463 able to be placed in an all-fiber system and allowing a delay longer than 500 ps to be obtained. The elements 461 and 467 are fiber couplers. The primary pulse is split into two pulses by the single-mode fiber coupler 461. After propagation through the two arms of the interferometer, the latter are recombined in the coupler 467.

In the case of an all-fiber laser source with a stretcher, it may be advantageous to place the stretcher 32 upstream of the interferometer 44 in order to limit distortion of the pulses during their propagation through the all-fiber interferometer by nonlinear effects.

In the example of FIG. 4, spectrally or temporally forming means 462 are also shown. The spectrally forming system may consist of a spectral filter (a dielectric bandpass filter or a filter based on a constant-pitch Bragg grating). The pulses may for example be temporally formed with a stretcher based on a variable-pitch Bragg grating. Of course, such means may be integrated into any one of the arms of an interferometer (including one that is not all-fiber) in order for example to make it possible to generate secondary laser pulses that are asymmetric in duration and in power. This configuration has the advantage of improving the sensitivity of the LIBS measurements. For example, in the case where two asymmetric pulses are emitted by the laser source, the first pulse of high peak power and of short duration serves to ablate the material to be analyzed and the second greatly stretched pulse of lower peak power serves to heat the plasma formed by the first pulse of the group.

It will be noted that one or more all-fiber preamplifiers may be used upstream of the single-mode amplifying optical fiber in order to ensure it operates in saturated-gain regime. Moreover, the secondary pulses may be coupled to the single-mode amplifying optical fiber via a splice (achieved by welding) making it possible for the primary source of the system to have a monolithic architecture up to the compression stage. For example, in the embodiment of FIG. 4, it is possible to place a preamplifier upstream of the single-mode amplifying optical fiber in order to adjust the power level so as to achieve gain saturation in the fiber.

Figure 5:
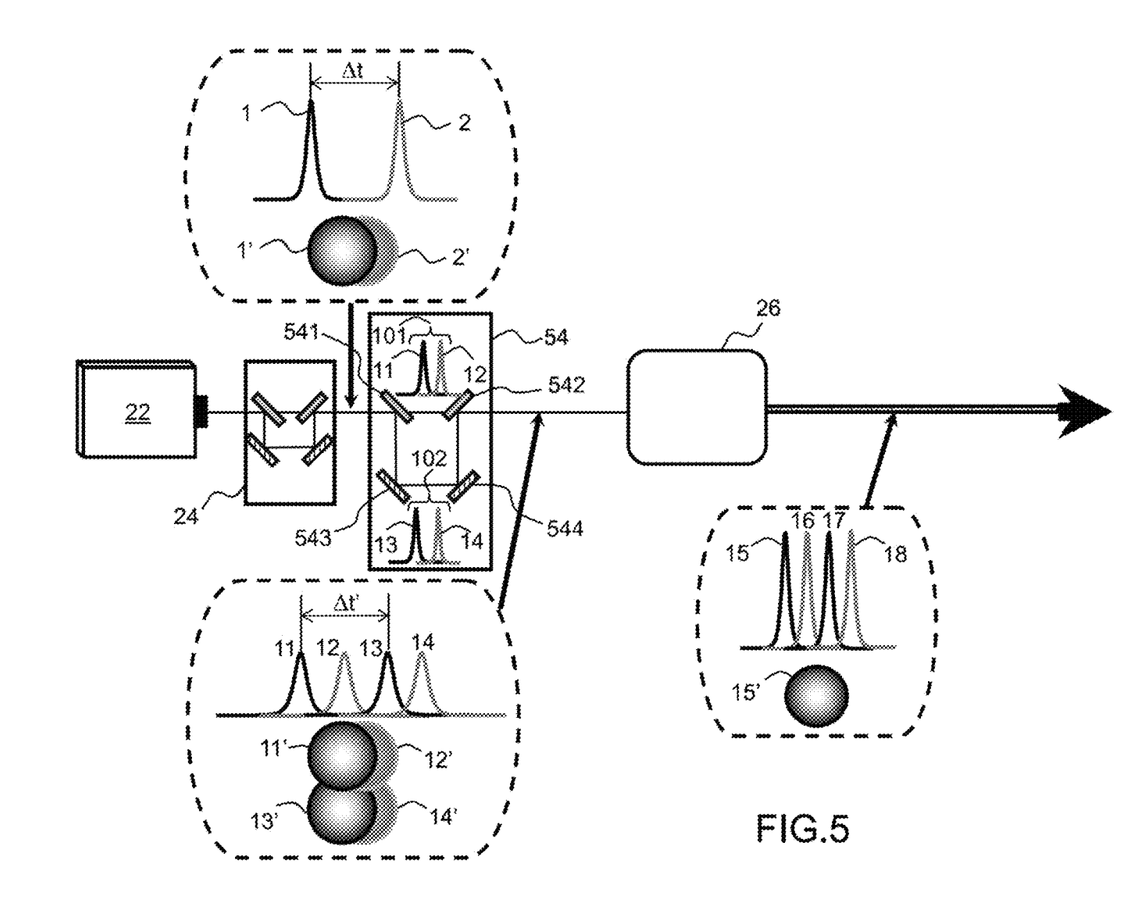
FIG. 5 and FIG. 6, schematics of a laser source for emitting a group of pulses composed of more than two pulses according to examples of the present description.
Figure 6:
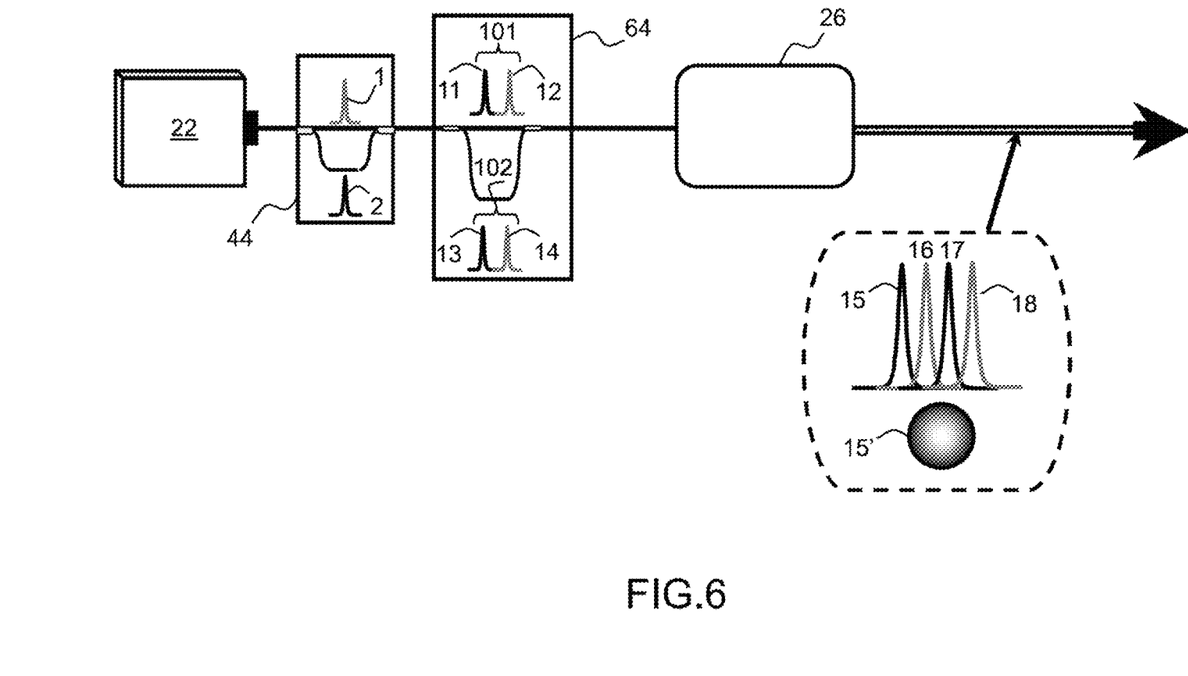
Figure 7:
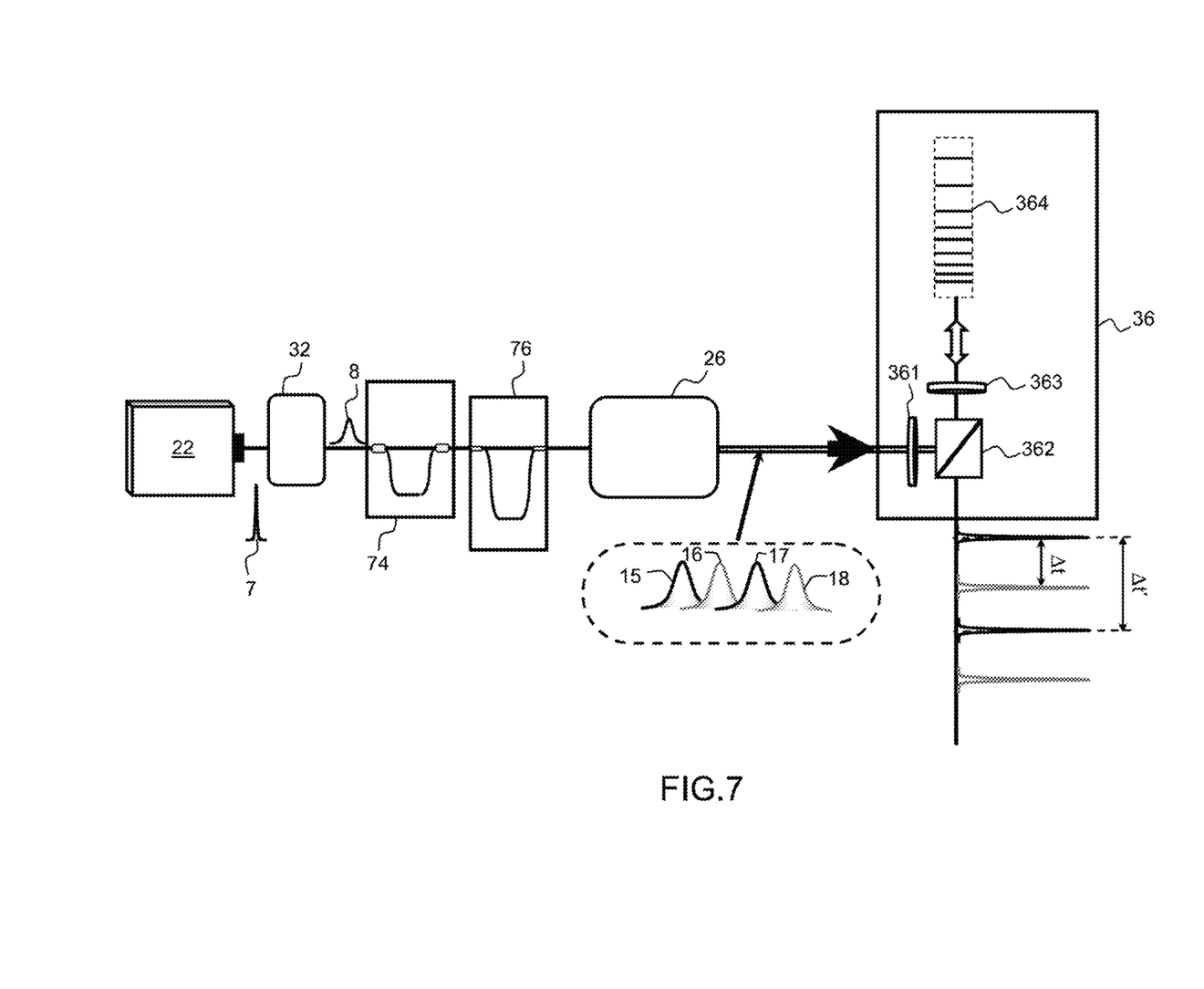
FIG. 7, a schematic of a laser source for emitting a group of pulses composed of more than two pulses according to one example of the present description, in which the laser source is all-fiber.

FIG. 5, FIG. 6 and FIG. 7 show other example embodiments in which the source may emit a group of more than two pulses, such as a triplet or even a quadruplet. To this end, the laser source may comprise a plurality of interferometers that are placed in series in order to generate even-number groupings (FIG. 5, FIG. 6, FIG. 7) or that are interleaved with one another in order to generate uneven-number groupings.

In FIG. 5, the laser source according to one example of the present description comprises two interferometers in series. As output from the first interferometer 24, two secondary laser pulses 1, 2 are generated. The two secondary laser pulses 1, 2 are sent to a second interferometer 54, for example a Mach-Zehnder interferometer. The second interferometer 54 may comprise, just like the first interferometer 24, two completely reflective mirrors 543, 544 and two half-silvered mirrors 541 and 542. Using one half-silvered mirror 541, the two secondary laser pulses output from the first interferometer are divided into two bunches of two secondary laser pulses 11, 12 and 13, 14 that trace two different optical paths. Next, using the two reflective mirrors 543, 544, the optical path of the secondary laser pulses 13 and 14 is lengthened with respect to the optical path of the secondary laser pulses 11 and 12. The half-silvered mirror 542 allows the four secondary laser pulses to be combined to form a group of pulses composed of the four secondary laser pulses. The spatial distribution 11', 12', 13' and 14' of the energy of the pulses is shown in the insert at the bottom left of FIG. 5. The secondary laser pulses 11, 12 on the one hand and 13, 14 on the other hand, are separated by a delay Δt calibrated by the first interferometer 24. The bunch of pulses 11, 12 is temporally offset with respect to the bunch of pulses 13, 14 by a delay Δt' calibrated by the second interferometer 54. The four secondary laser pulses are then sent to the amplifying module 26 comprising the single-mode amplifying optical fiber in order to form a group of four spatially superposed pulses 15, 16, 17, 18 as illustrated in the insert at the bottom right of FIG. 5.

Of course, depending on the requirements, it is possible to insert more than two interferometers into the laser source according to the present description.

FIG. 6 shows an example according to the present description of an all-fiber laser source for emitting a group of four pulses. Some of the elements of FIG. 4 are also found in this example: the primary laser source 22, the all-fiber first interferometer 44 and the amplifying module 26 comprising the single-mode amplifying fiber; this example illustrates the case of two all-fiber interferometers 44, 64, arranged in series, for forming a group of 4 pulses. The operation is similar to that of the example of FIG. 5; likewise, the all-fiber elements are similar to those of FIG. 4. Specifically, the optical path from the primary laser source to the entrance of the single-mode amplifying optical fiber is entirely all-fiber.

According to one or more embodiments, one or more optionally all-fiber preamplifiers may be used upstream of the single-mode amplifying optical fiber in order to ensure it operates in saturated-gain regime.

FIG. 7 shows an example according to the present description of a schematic of an all-fiber laser source for emitting a group of four pulses furthermore comprising a stretcher 32 placed after the primary source 22 but before a first interferometer 74, and a compressor 36 placed downstream of the amplifying module 26 comprising the single-mode amplifying optical fiber. This source operates in the same way as the source of FIG. 3. A second interferometer 76 may also be employed, as illustrated in the figure.

Figure 8:
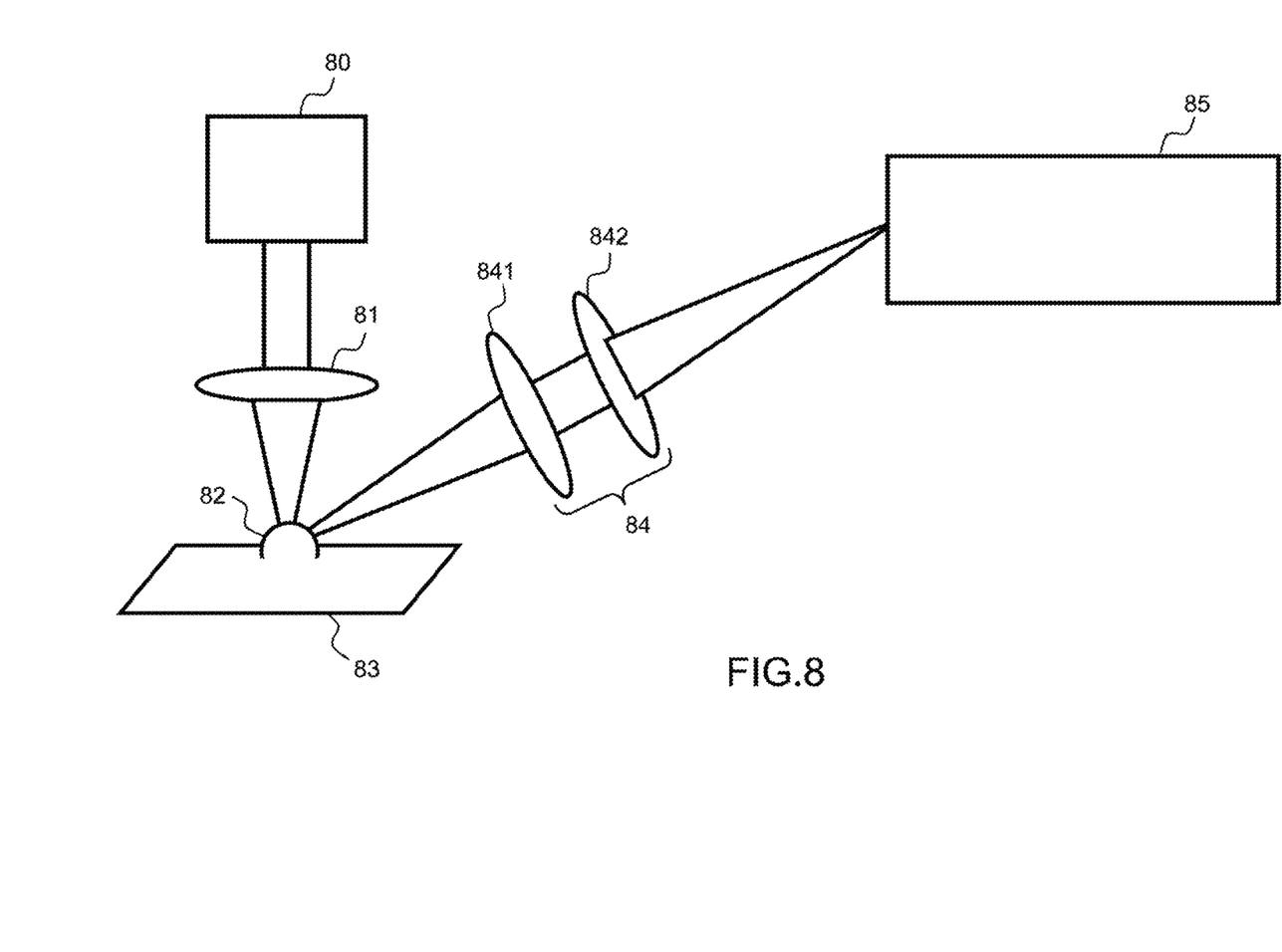
FIG. 8, a schematic of an LIBS analysis system according to one example of the present description.

The laser source according to the present description is perfectly suitable for LIBS measurements. FIG. 8 illustrates an example of an LIBS analysis system according to the present description. The LIBS analysis system comprises a laser source 80 according to the present description for emitting a group of pulses. The group of pulses is focused onto a sample 83 to be analyzed, for example using a lens 81. The interaction between the group of pulses and the sample 83 will firstly generate a plasma 82 then secondly light radiation. A fraction of the emitted radiation is collected by an optical system 84 such as for example a doublet of lenses 841, 842. The beam is then detected by a spectrometer 84 allowing, on the basis of the spectral analysis of the collected radiation, the LIBS spectrum of the object to be analyzed to be obtained.

According to one or more examples of the present description, the laser source emits trains of groups of pulses, and it is thus possible to take LIBS measurements averaged over several shots.

Figure 9A:
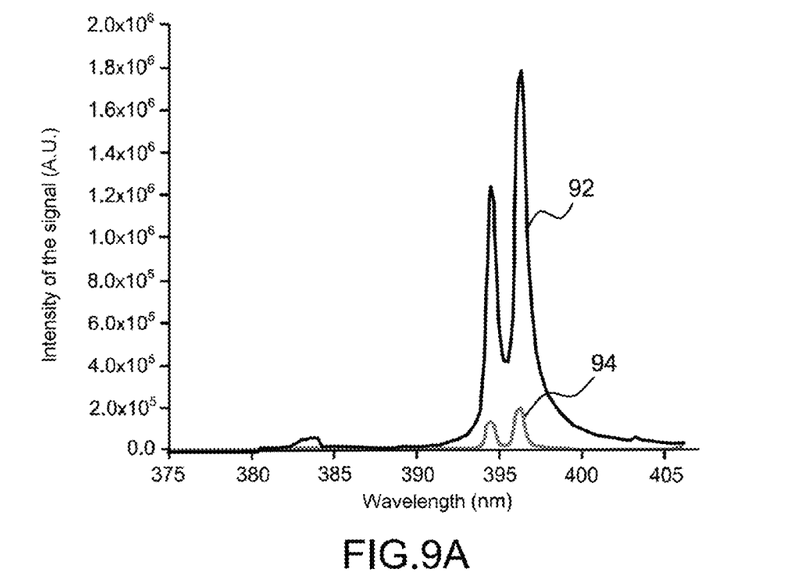
FIGS. 9A and 9B, characteristic aluminum spectra obtained by single-pulse LIBS and by DP-LIBS using a laser source to emit a group of pulses according to one example of the present description, the pulses of the laser source having an inter-pulse delay of 50 ps and of 750 ps, respectively.
Figure 9B:
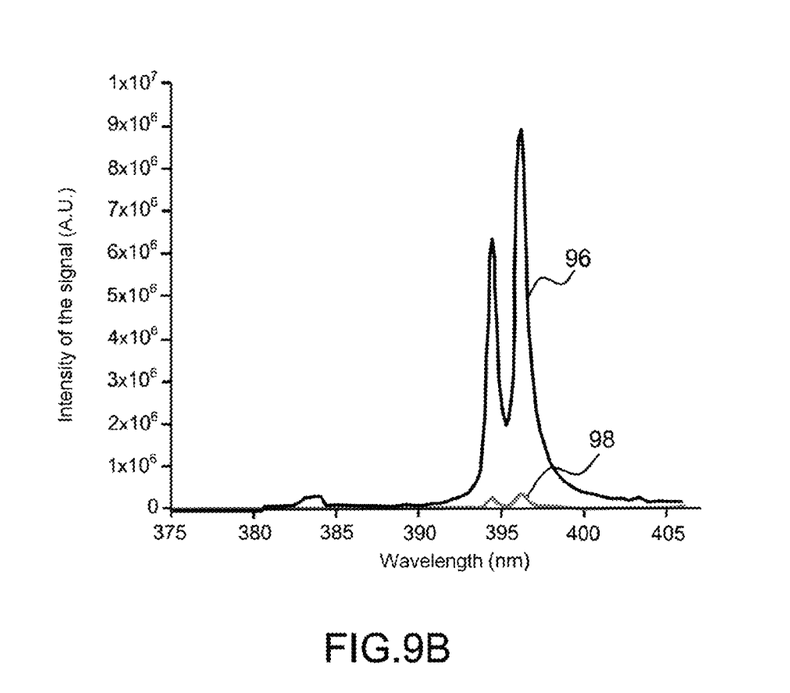

FIG. 9A and FIG. 9B show spectra obtained with an LIBS analysis system according to the present description. The analysis system comprises, in this example, a laser source such as shown in FIG. 2 for emitting doublets of pulses. The primary laser source comprises a mode-locked all-fiber laser emitting pulses of 500 fs duration at a repetition rate of 18 MHz and at a wavelength of 1040 nm. It is followed by an acousto-optical modulator in order to divide the repetition rate by a factor of more than 40, and by an all-fiber preamplifier in order to ensure the power amplifier is saturated. A mirror-based Mach-Zehnder interferometer as shown in FIG. 2 is used to generate two secondary pulses separated by a delay comprised between 50 ps and 10 ns. The amplifying optical fiber is a microstructured rod-type photonic-crystal fiber the 80 μm diameter core of which is doped with ytterbium ions. The fiber is pumped in counter-propagating mode by a laser beam centered on 976 nm generated by an all-fiber laser diode. The spectra 92 and 96 correspond to the emission spectra of the ablation plasma of a sample made of aluminum in the spectral range 375-405 nm obtained in dual-pulse regime with a delay of 50 ps for FIG. 9A and 750 ps for FIG. 9B. These spectra are compared to the (identical) spectra 94, 98 obtained in single-pulse regime. The single-pulse regime consisted in making a single pulse interact with the sample to be analyzed by blocking one of the arms of the interferometer. It will be noted that the total energy transmitted to the sample to be analyzed in these experiments was kept constant from one experiment to the next. In particular, it was set to 2 μJ per pulse in the case of the single-pulse LIBS and to 1 μJ per pulse in the case of the DP-LIBS, this also corresponding to a total of 2 μJ. The two main known rays of aluminum, which are centered on 394.40 nm and 396.15 nm, may be clearly seen in the measured spectra. With respect to the measurements taken in single-pulse LIBS regime, the detection sensitivity of these rays increases by a factor of 10 in DP-LIBS with an inter-pulse delay of 50 ps and by a factor of 20 with a delay of 750 ps.

Although described by way of a certain number of example embodiments, the laser source for emitting a group of pulses, the laser-induced-breakdown-spectroscopy analysis system and the method for generating a group of pulses have various variants, modifications and improvements that will appear obvious to those skilled in the art, these various variants, modifications and improvements hence falling within the scope of the invention such as defined by the following claims.

The invention claimed is:

1. A laser source for emitting a group of pulses, comprising: a primary laser source suitable for emitting at least one primary laser pulse,
one or more interferometers suitable for forming, from said primary laser pulse, a plurality of secondary laser pulses, each interferometer comprising at least one delay line allowing two secondary laser pulses to be temporally separated by a delay ($\Delta t$, $\Delta t'$) comprised between 50 ps and 10 ns, said one or more interferometers comprising means for spectrally and/or temporally forming at least one of the secondary laser pulses
a single-mode amplifying optical fiber intended to receive said plurality of secondary laser pulses, in order to form as output a group of spatially superposed pulses.

2. The laser source as claimed in claim 1, wherein at least one of said interferometers comprises means for controlling the relative optical power of the secondary laser pulses.

3. The laser source as claimed in claim 1, furthermore comprising:
a stretcher placed upstream of the single-mode amplifying optical fiber such that the primary laser pulse is stretched to a pulse duration longer than 50 ps, and
a compressor downstream of the single-mode amplifying optical fiber in order to temporally compress the pulses of the group of pulses such that the pulses of the group of pulses have a pulse duration shorter than 500 fs.

4. The laser source as claimed in claim 1, furthermore comprising:
at least one optical preamplifier placed upstream of the amplifying optical fiber.

5. The laser source as claimed in claim 1, comprising:
a laser diode for optically pumping the single-mode amplifying optical fiber.

6. The laser source as claimed in claim 1, wherein the single-mode amplifying optical fiber is intended to operate in saturated-gain regime.

7. The laser source as claimed in claim 1, wherein the path of said at least one primary laser pulse and of the secondary laser pulses between the primary laser source and the entrance of the single-mode amplifying optical fiber is all-fiber.

8. The laser source as claimed in claim 1, wherein the primary laser source is suitable for emitting a train of primary laser pulses that are temporally separated by a delay of at least 2 μs.

9. The laser source as claimed in claim 1, wherein said one or more interferometers comprise at least one Mach-Zehnder interferometer, the delay line being formed by one arm of the interferometer.

10. A laser-induced-breakdown-spectroscopy (LIBS) analysis system, comprising:
    a laser source for emitting a group of pulses, as claimed in claim 1,
    a collector for collecting a beam resulting from the interaction between an object to be analyzed and the group of pulses emitted by the laser source; and
    a spectrometer that allows, on the basis of the spectral analysis of the collected beam, the LIBS spectrum of the object to be analyzed to be obtained.

11. A method for generating a group of pulses, comprising the following steps:
    emitting at least one primary laser pulse,
    generating, from said primary pulse, a plurality of secondary laser pulses that are temporally separated by a delay comprised between 50 ps and 10 ns, by means of one or more interferometers, said generating step furthermore comprising the step of spectrally and/or temporally forming at least one of the secondary laser pulses,
    injecting the secondary laser pulses into a single-mode amplifying optical fiber in order to form a group of spatially superposed pulses.

12. The method for generating a group of pulses as claimed in claim 11, furthermore comprising the following steps:
    temporally stretching the primary laser pulse such that the primary laser pulse is stretched to a pulse duration longer than 50 ps, and
    temporally compressing the pulses of the group of spatially superposed pulses such that the pulses of the group of spatially superposed pulses have a pulse duration shorter than 500 fs.

13. The method for generating a group of pulses as claimed in claim 11, furthermore comprising saturating the gain of the single-mode amplifying optical fiber.

14. The method for generating a group of pulses as claimed in claim 11, furthermore comprising an adjustment of the delay between the secondary laser pulses.

* * * * *